United States Patent
Leclerc et al.

(10) Patent No.: US 7,050,722 B2
(45) Date of Patent: May 23, 2006

(54) SYNCHRONOUS OPTICAL REGENERATOR USING INTENSITY MODULATION AND PHASE MODULATION BY THE CROSSED KERR EFFECT

(75) Inventors: Olivier Leclerc, Saint Michel S/Orge (FR); Emmanuel Desurvire, Le Chatel (FR)

(73) Assignee: Alcatel, Paris (FR)

( * ) Notice: Subject to any disclaimer, the term of this patent is extended or adjusted under 35 U.S.C. 154(b) by 980 days.

(21) Appl. No.: 09/810,251

(22) Filed: Mar. 19, 2001

(65) Prior Publication Data

US 2001/0022678 A1    Sep. 20, 2001

(30) Foreign Application Priority Data

Mar. 20, 2000   (FR) .................................. 00 03518

(51) Int. Cl.
*H04B 10/00* (2006.01)
(52) U.S. Cl. ........................................ 398/175; 398/97
(58) Field of Classification Search ................. 398/52, 398/80, 81, 91, 92, 147, 148–150, 154–155, 398/97, 173–181
See application file for complete search history.

(56) References Cited

U.S. PATENT DOCUMENTS

| | | | | |
|---|---|---|---|---|
| 4,914,407 A | * | 4/1990 | Itoh | 333/161 |
| 5,515,196 A | * | 5/1996 | Kitajima et al. | 398/185 |
| 5,737,110 A | * | 4/1998 | Suzuki et al. | 398/146 |
| 5,857,040 A | * | 1/1999 | Bigo et al. | 385/15 |
| 5,926,297 A | * | 7/1999 | Ishikawa et al. | 398/43 |
| 5,963,567 A | * | 10/1999 | Veselka et al. | 372/21 |
| 6,201,621 B1 | * | 3/2001 | Desurvire et al. | 398/154 |
| 6,204,944 B1 | * | 3/2001 | Uchiyama et al. | 398/79 |
| 6,229,632 B1 | * | 5/2001 | Jabr | 398/183 |
| 6,262,828 B1 | * | 7/2001 | Akiyama et al. | 359/237 |
| 6,307,984 B1 | * | 10/2001 | Watanabe | 385/24 |
| 6,317,529 B1 | * | 11/2001 | Kashima | 385/16 |
| 6,337,755 B1 | * | 1/2002 | Cao | 398/97 |
| 6,411,416 B1 | * | 6/2002 | Ooi et al. | 398/141 |
| 6,486,990 B1 | * | 11/2002 | Roberts et al. | 398/98 |
| 6,493,495 B1 | * | 12/2002 | Liu et al. | 385/126 |
| 6,587,242 B1 | * | 7/2003 | Shake et al. | 398/98 |
| 6,643,046 B1 | * | 11/2003 | Ibe et al. | 359/238 |

FOREIGN PATENT DOCUMENTS

| EP | 0 862 286 A1 | 9/1998 |
|---|---|---|
| WO | WO 93/22855 | 11/1993 |

* cited by examiner

*Primary Examiner*—Agustin Bello
(74) *Attorney, Agent, or Firm*—Sughrue Mion, PLLC

(57) ABSTRACT

A synchronous optical regenerator applies intensity modulation and phase modulation. The phase modulation is effected after the intensity modulation by the crossed Kerr effect in a Kerr fiber. The clock used for the phase modulation is obtained by injecting a continuous wavelength into the intensity modulator. The regenerator therefore includes a multiplexer coupling continuous light with the signals transmitted, an intensity modulator modulating the signals transmitted and the continuous light, and a Kerr fiber phase modulating the transmitted signals by crossed phase modulation with the intensity-modulated continuous light. Applications include wavelength division multiplex transmission systems.

30 Claims, 2 Drawing Sheets

FIG_1
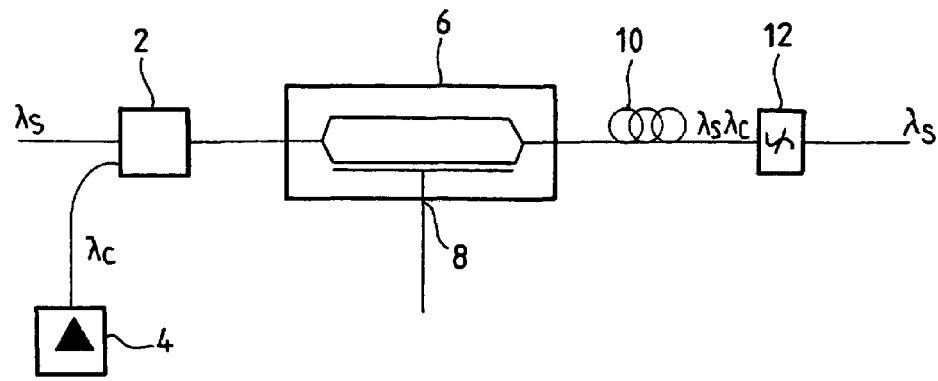
FIG_2
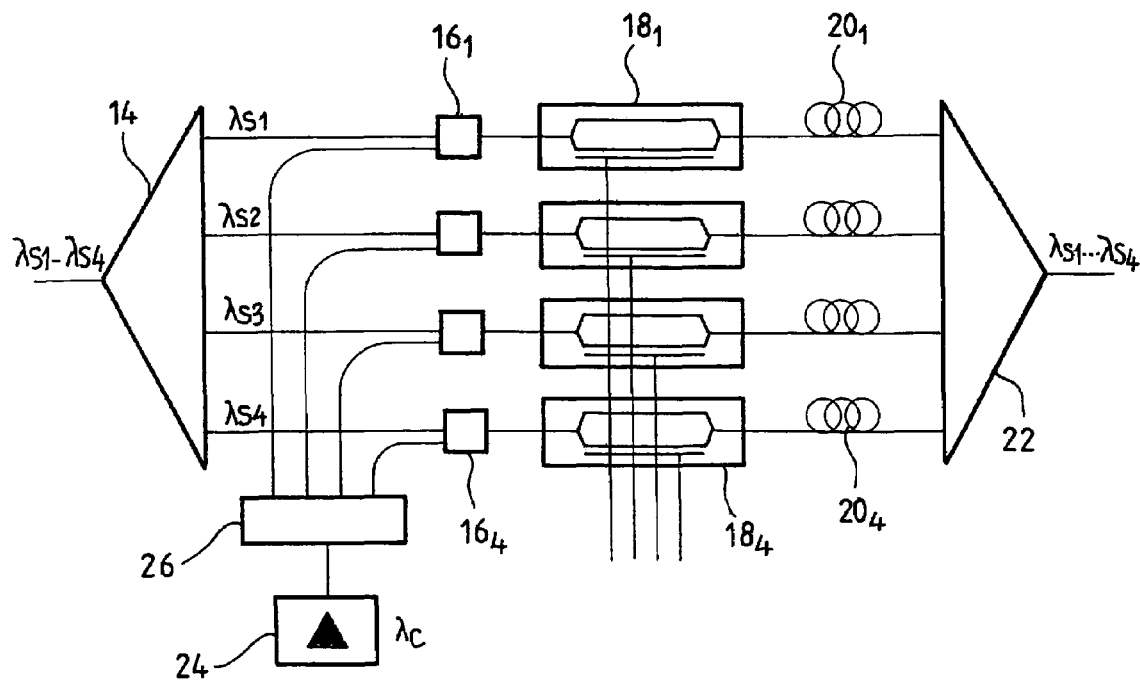

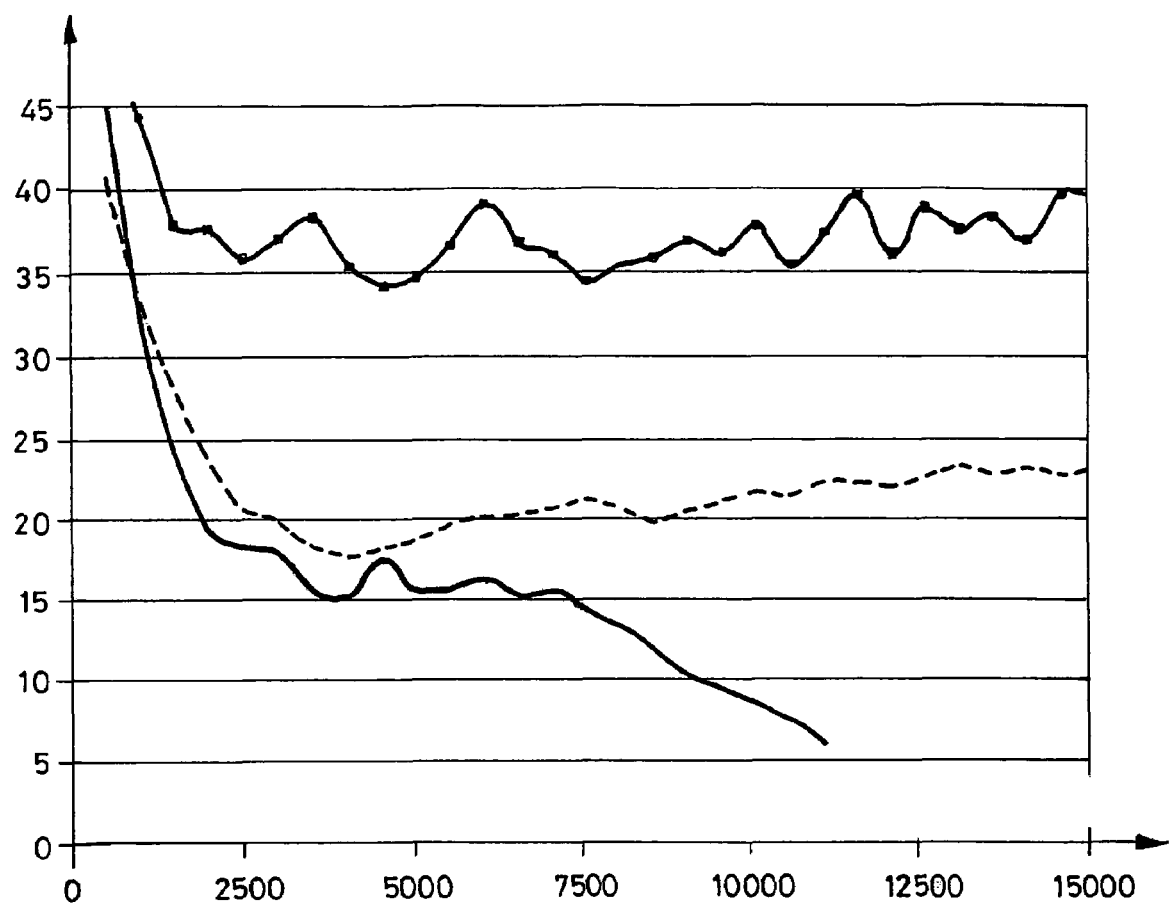
FIG_3

SYNCHRONOUS OPTICAL REGENERATOR USING INTENSITY MODULATION AND PHASE MODULATION BY THE CROSSED KERR EFFECT

BACKGROUND OF THE INVENTION

1. Field of the Invention

The invention relates to fiber optic transmission systems, in particular wavelength division multiplex fiber optic transmission systems, and more precisely to regeneration in wavelength division multiplex fiber optic transmission systems.

2. Description of the Prior Art

Regular synchronous modulation of signals has been proposed in wavelength division multiplex fiber optic transmission systems, preferably optical modulation, especially in high bit rate systems. Various methods have been proposed for synchronizing the various channels at the time of regeneration, including allocating wavelengths assuring synchronization at regular intervals on the link, applying time-delays, modulating at a frequency that is a multiple of the signal frequency.

The modulation can be intensity modulation and/or phase modulation.

The paper by F. Devaux et al., "20 Gbit/s operation of high efficiency InGaAs/InGaAsP MQW electroabsorption modulators with 1.2 V driven voltage", IEEE Photonics Techn. Lett., vol. 5 pages 1288–1290 (1993), describes intensity modulation with narrow filtering using an electroabsorption modulator.

The paper by M. Nakazawa et al., "Experimental demonstration of soliton data transmission over unlimited distance with soliton control in time and frequency domains", Electronics Letters, vol. 29 No. 9, pages 729–730, describes another form of intensity modulation; the document proposes the use of an LiNbO$_3$ Mach-Zender intensity modulator. The paper by Leclerc et al., "Polarization independent InP push-pull Mach-Zender modulator for 20 Gbit/s solitons regeneration", Electronics Letters, vol. 34 No. 10, pages 1011–1013 (1998), describes an InP Mach-Zender intensity modulator.

Phase modulation by the crossed Kerr effect between the signals transmitted and a clock propagating in a Kerr fiber is known in the art. The paper by S. Bigo and O. Leclerc, "Fundamental limits of all-optical synchronous phase regeneration through Kerr fiber", Proceedings d'ECOC'97, p. 311, Edinburgh, 22–25 September, describes one example of the use of this kind of technique; the paper shows that phase modulation by the Kerr effect can be effective, even in the presence of noise or slip between the signals transmitted and the modulation clock. The paper by O. Leclerc et al., "2×20 Gbit/s, 3500 km regenerated WDM soliton transmission with all-optical Kerr fiber modulation", vol. 34 No. 2, pages 199–201 (1998), shows the feasibility of phase modulation by the Kerr effect in wavelength division multiplex transmission systems.

Phase modulation and intensity modulation in a regenerator are also known in the art. The paper by P. Brindel et al., "Black-box optical regenerator for RZ transmission systems" Electronics Letters, vol. 35 No. 6 (1999), pp. 480–481, proposes separate intensity modulation and then phase modulation. The paper by B. Dany et al., "Transoceanic 4×40 Gbit/s system combining dispersion-managed soliton transmission and new "black-box" in-line optical regeneration", Electronics Letters, vol. 35 No. 5 (1999), pp. 418–420, applies the same regeneration technique to a four-channel transmission system using controlled dispersion soliton propagation with separation of channels and one regenerator per channel.

FR-A-2 759 830 and French patent application 99 14117 filed on 10 Nov. 1999 (PCT/FR00/03124), "Channel synchronization by dispersive fiber in a wavelength division multiplex transmission system", propose synchronous regeneration by intensity modulation followed by phase modulation in separate modulators.

U.S. patent application Ser. No. 09/000,451 proposes using a non-linear optical mirror in a loop with two control inputs for phase modulation of optical signals. It refers to a non-linear optical mirror with two control inputs and is therefore the fiber equivalent of a Mach-Zender modulator with two electrodes, and allows independent control of the intensity and phase modulation depth.

The above solutions have disadvantages. Separating phase modulation and intensity modulation is a complex and therefore costly solution. The non-linear loop mirror technique does not allow control of accumulation of noise or dispersive waves and this conjoint modulation solution limits the total length of the transmission system.

The invention proposes a solution that overcomes these various disadvantages; it proposes a regenerator using intensity modulation and phase modulation with a minimum of hardware components and simple operation.

SUMMARY OF THE INVENTION

To be more precise, the invention proposes a regenerator for an optical transmission system including a multiplexer coupling continuous light with transmitted signals, an intensity modulator modulating said transmitted signals and said continuous light and a Kerr fiber phase modulating said transmitted signals with the intensity-modulated continuous light by crossed phase modulation.

In one embodiment the regenerator further includes a filter downstream of the Kerr fiber for filtering the continuous light.

The intensity modulator is advantageously a Mach-Zender modulator.

In one embodiment the Kerr fiber has a non-linearity index greater than $2.7 \times 10^{-20}$ m$^2$/W. It is advantageous if the chromatic dispersion of the Kerr fiber cancels out at a wavelength which is the average of the wavelengths of the transmitted signals and the continuous light.

The depth of the intensity modulation is preferably greater than 1 dB and even more preferably greater than 3 dB.

The invention also proposes a regenerator for a wavelength division multiplex optical transmission system including:

a demultiplexer supplying demultiplexed channels at its output, for each demultiplexed channel, a multiplexer coupling continuous light with the signals of the channel, an intensity modulator modulating the signals of the channel and the continuous light and a Kerr fiber phase modulating the transmitted signals with the intensity-modulated continuous light by crossed phase modulation, and a multiplexer receiving the phase-modulated signals of each channel and supplying a multiplexed signal.

In one embodiment the continuous light is supplied by a single source. In this case an amplifier can be provided for amplifying the signals from the source.

In another embodiment the intensity modulator is a Mach-Zender modulator. It is also preferable if the Kerr fiber has a non-linearity index greater than $2.7 \times 10^{-20}$ m$^2$/W.

In one embodiment the chromatic dispersion of the Kerr fiber for a channel cancels out at a wavelength which is the average of the wavelengths of the signals of the channel and the continuous light.

The depth of intensity modulation in an intensity modulator is preferably greater than 1 dB and even more preferably greater than 3 dB.

The invention further proposes a fiber optic transmission system including a regenerator as defined above.

It finally proposes an optical regeneration method including the following steps:

coupling continuous light with transmitted signals;

conjoint intensity modulation of the transmitted signals and the continuous light; and phase modulation of the transmitted signals by crossed phase modulation with the intensity-modulated continuous light.

The intensity modulation is preferably effected with a modulation depth greater than 1 dB.

In another embodiment of the method the phase modulation is effected with a modulation depth of 3 dB.

A step of filtering the intensity-modulated continuous light preferably follows the modulation step.

Other features and advantages of the invention will become apparent after reading the following description of embodiments of the invention, which description is given by way of example and with reference to the accompanying drawings.

BRIEF DESCRIPTION OF THE DRAWINGS

FIG. 1 is a diagrammatic representation of a single-channel embodiment of a regenerator according to the invention.

FIG. 2 is a diagrammatic representation of a wavelength division multiplex embodiment of a regenerator according to the invention.

FIG. 3 is a graph of the quality factor as a function of distance for transmission systems using regenerators in accordance with the invention and prior art regenerators.

DETAILED DESCRIPTION OF THE PREFERRED EMBODIMENT

The invention proposes to combine intensity modulation and phase modulation by the crossed Kerr effect between the signals and a clock. It proposes to intensity modulate a continuous signal in the intensity modulator to generate an optical clock synchronized to the transmitted signals. This solution enables simple and accurate generation of an optical clock which propagates with the signals transmitted and which can be used for phase modulation in a Kerr fiber.

FIG. 1 is a diagrammatic representation of a single-channel embodiment of a regenerator according to the invention; in the direction of transmission of signals at a wavelength $\lambda_S$, the FIG. 1 regenerator includes a multiplexer 2 which couples into the same fiber as the transmitted signals the light from a continuous source 4 at a wavelength $\lambda_C$ different from the wavelength $\lambda_S$ of the transmitted signals. The source can be a pre-amplified source, if necessary a high power ("boosted") source to increase the intensity of the clock signal in the phase modulator. The regenerator then includes an intensity modulator 6 which receives at its input the signals received at the input of the regenerator and the continuous light coupled by the multiplexer and at its modulation input 8 a modulation clock which is a radio frequency clock in this example. FIG. 1 does not show the clock recovery device, which can be of a kind known in the art. In the example shown in the figure, the intensity modulator 6 is a modulator implemented on a chip, for example an InP Mach-Zender modulator. A different type of modulator can be used instead. The intensity-modulated transmitted signals at the wavelength $\lambda_S$ and an optical clock at the wavelength $\lambda_C$ obtained by modulating the continuous light in the intensity modulator are obtained at the modulator output. The clock obtained in this way is clearly perfectly synchronized with the transmitted signals and is intensity-modulated at the same time as the transmitted signals. From this point of view, the intensity modulator modulates the signals in accordance with the invention and also generates a perfectly synchronized clock. To assure these two functions it is sufficient for the wavelength $\lambda_C$ of the continuous signal to be within the pass-band of the modulator; it is a simple matter to satisfy this constraint, in particular for an InP intensity modulator, which conventionally provides modulation over a 15 nm band. The modulation depth in the intensity modulator is typically from 1 to 20 dB, depending in particular on the width of the associated filter and the "quality" of the signal to be regenerated. It has no significant impact on the quality of the phase modulation induced by the Kerr effect. It is nevertheless preferable for it to be in excess of values of the order of 1 dB or even 3 dB.

The regenerator has a Kerr fiber 10 at the output of the intensity modulator and conjoint propagation in the Kerr fiber of the signals at the wavelength $\lambda_S$ and the clock at the wavelength $\lambda_C$ induces phase modulation of the signals by the crossed Kerr effect. The fiber 10 is chosen to have high non-linearities as this encourages the Kerr effect; the fiber 10 can in particular have a non-linearity index $n_2$ greater than $2.7 \times 10^{-20}$ m$^2$/W and is typically a DSF/SMF or chalcogenide fiber. It is preferable to limit the effects of slip between the transmitted signals and the clock in the phase modulator. From this point of view, the chromatic dispersion of the fiber is advantageously chosen to be zero for a wavelength which is the average $(\lambda_S + \lambda_C)/2$ of the wavelengths of the transmitted signals and the clock obtained by intensity modulation. This choice of Kerr fiber limits the slip between the clock and the modulated signals along the modulation fiber 10.

Intensity-modulated and then phase-modulated signals at the wavelength $\lambda_S$ are obtained at the output of the phase modulation fiber. The regenerator then has a filter 12 for filtering the clock signal at the wavelength $\lambda_C$. Depending on the spectral position of the continuous wavelength relative to the wavelength of the signals, the filter can be a pass-band filter, a high-pass filter or a low-pass filter. Only the intensity-modulated and then phase-modulated transmitted signals are obtained at the output of the filter.

The invention has the following advantages over the prior art. Compared to prior art intensity modulation, it applies phase modulation without significantly increasing the complexity of the regenerator. The only additional components required are a continuous source, a multiplexer, a Kerr fiber and a filter for filtering the continuous light. Separate intensity modulation and phase modulation enable the phase modulation clock to be generated during intensity modulation, as explained above. Adding phase modulation to intensity modulation improves the performance of the regenerator, as explained with reference to FIG. 3.

FIG. 2 is a diagrammatic representation of a wavelength division multiplex embodiment of a regenerator according to the invention. The example shown in the figure relates to a four-channel transmission system. The regenerator includes a demultiplexer 14 which receives at its input the multiplexed signals and which supplies at four outputs the signals at the wavelengths $\lambda_{S1}$ to $\lambda_{S4}$ of the various channels. Like that shown in FIG. 1, the regenerator shown in FIG. 2 includes, for each channel, a multiplexer $16_i$ for injecting a continuous source, an intensity modulator $18_i$ and Kerr fiber $20_i$. The signals leaving the Kerr fiber are applied to an input of a multiplexer 22.

Instead of a merely multiplying the FIG. 1 device, the FIG. 2 example uses a single source 24 for the signals at the continuous wavelength $\lambda_C$. The output of that source is amplified by an amplifier 26 and applied to the various multiplexers $16_i$. The multiplexer 22 also filters the phase modulation clock and it is therefore unnecessary for each branch of the regenerator to include a filter like the filter 12 shown in FIG. 1.

The intensity modulator and the phase modulator can be implemented as explained with reference to FIG. 1. In particular, the Kerr fiber of each channel can be chosen so that it has zero chromatic dispersion for a wavelength which is the average $(\lambda_{Si}+\lambda_C)/2$ of the wavelength of the signals of the channel in question and the wavelength of the clock obtained by intensity modulation.

Like FIG. 1, FIG. 2 does not show the intensity modulation clock generator. A single clock can be used if the channels are synchronized, or separate clocks, as shown diagrammatically in the figure.

In both embodiments the power of the continuous source depends on the power required for the phase modulation clock. A phase difference of the order of 3° between the clock and the signal transmitted through the Kerr fiber is appropriate and corresponds to a depth of modulation of the order of $\pi/50$. In a silica fiber, a phase difference of this magnitude can be obtained with a clock having a peak power of the order of 2 mW (+3 dBm). That value is used to calculate the power of the continuous source, allowing for losses in the intensity modulator. With a typical value for an InP Mach-Zender modulator of 13 dB, a source power to be coupled into the fiber of the order of 16 dBm is obtained. That power can be obtained from a source which is pre-amplified and/or boosted if necessary. Losses across the modulator can be reduced in particular by providing conical fiber sections at the modulator input and output to reduce insertion losses. The power of the continuous pump can be reduced by 3 to 6 dB in this way.

In a configuration with four channels, the same hypotheses yield a source power of the order of +21 dBm. Once again, that power can be obtained with a semiconductor source, if necessary associated with an amplifier.

Using a chalcogenide fiber with higher non-linearities for phase modulation also reduces the phase modulation clock power and therefore the power of the continuous source injected into the intensity modulator. Once again, the reduction is of the order of 3 to 6 dB.

FIG. 3 is a graph of the quality factor (Q factor) as a function of distance in km for transmission systems using regenerators according to the invention and prior art regenerators. The figure shows in bold line the quality factor obtained for regeneration by phase modulation only using the Kerr effect, the dashed line shows the quality factor obtained for regeneration by intensity modulation only, and, finally, the continuous line with squares shows the quality factor obtained using regenerators in accordance with the invention. The FIG. 3 results were obtained for single-channel soliton signals. The distance between amplifiers in the transmission system was 45 km and the distance between the generators was 90 km, as in the experiment described in the paper by S. Bigo and O. Leclerc referred to above. The intensity modulation used a modulation depth of 3 dB and the filter was a filter with a pass-band of 0.7 nm. The power of the clock was set at 3 dBm, which produced 5° of phase modulation. The transmission system was optimized in terms of the amplifier output power for each configuration: phase modulation only, intensity modulation only, or phase and intensity modulation.

The figure shows that in the case of phase modulation alone by the crossed Kerr effect the quality factor decreases with distance for lengths greater than 7 500 km. In the case of intensity modulation, the Q factor tends toward an asymptotic value of the order of 22 for distances of the order of 15 000 km. Modulation in accordance with the invention enables much higher asymptotic values, of the order of 35, to be obtained.

In a soliton signal wavelength division multiplex transmission system, an additional advantage of phase modulation is that it limits signal jitter and therefore limits the effects of collisions between solitons of adjoining channels.

Of course, the present invention is not limited to the examples and embodiments described and shown, and many variants will suggest themselves to the skilled person. It is clear that different continuous light sources can be used for the various channels of the multiplex, in particular when the number of channels is greater. The FIG. 3 examples are for soliton signals: the invention also applies to other RZ or other signals. In a wavelength division multiplex transmission system, synchronous channels can be conjointly phase-modulated and intensity-modulated, in which case the regenerator from FIG. 1 can be used if all the channels are synchronized. Alternatively, a plurality of synchronized channels can be passed through one branch of the FIG. 2 regenerator.

There is claimed:

1. A regenerator for an optical transmission system including a multiplexer coupling continuous light with transmitted signals, an intensity modulator modulating said transmitted signals and said continuous light and a Kerr fiber phase modulating said transmitted signals with the intensity-modulated continuous light by crossed phase modulation.

2. The regenerator claimed in claim 1 further including a filter downstream of said Kerr fiber for filtering said continuous light.

3. The regenerator claimed in claim 1 wherein said intensity modulator is a Mach-Zender modulator.

4. The regenerator claimed in claim 1 wherein said Kerr fiber has a non-linearity index greater than $2.7 \times 10^{-20}$ m$^2$/W.

5. The regenerator claimed in claim 1 wherein the chromatic dispersion of said Kerr fiber cancels out at a wavelength which is the average of the wavelengths of said transmitted signals and said continuous light.

6. The regenerator claimed in claim 1 wherein the depth of said intensity modulation is greater than 1 dB and preferably greater than 3 dB.

7. A regenerator for a wavelength division multiplex optical transmission system including:
   a demultiplexer supplying demultiplexed channels at its output,
   for each demultiplexed channel, a multiplexer coupling continuous light with the signals of said channel, an intensity modulator modulating said signals of said channel and said continuous light and a Kerr fiber phase modulating said transmitted signals with said intensity-modulated continuous light by crossed phase modulation, and
   a multiplexer receiving said phase-modulated signals of each channel and supplying a multiplexed signal.

8. The regenerator claimed in claim 7 wherein said continuous light is supplied by a single source.

9. The regenerator claimed in claim 8 including an amplifier for amplifying said signals from said source.

10. The regenerator claimed in claim 7 wherein said intensity modulator is a Mach-Zender modulator.

11. The regenerator claimed in claim 7 wherein said Kerr fiber has a non-linearity index greater than $2.7 \times 10^{-20}$ m$^2$/W.

12. The regenerator claimed in claim 7 wherein the chromatic dispersion of said Kerr fiber for a channel cancels out at a wavelength which is the average of the wavelengths of said signals of said channel and said continuous light.

13. The regenerator claimed in claim 7 wherein the depth of intensity modulation in an intensity modulator is greater than 1 dB and preferably greater than 3 dB.

14. A fiber optic transmission system including a regenerator for an optical transmission system including a multiplexer coupling continuous light with transmitted signals, an intensity modulator modulating said transmitted signals and said continuous light and a Kerr fiber phase modulating said transmitted signals with the intensity-modulated continuous light by crossed phase modulation.

15. The system claimed in claim 14 further including a filter downstream of said Kerr fiber for filtering said continuous light.

16. The system claimed in claim 14 wherein said intensity modulator is a Mach-Zender modulator.

17. The system claimed in claim 14 wherein said Kerr fiber has a non-linearity index greater than $2.7 \times 10^{-20}$ m$^2$/W.

18. The system claimed in claim 14 wherein the chromatic dispersion of said Kerr fiber cancels out at a wavelength which is the average of the wavelengths of said transmitted signals and said continuous light.

19. The system claimed in claim 14 wherein the depth of said intensity modulation is greater than 1 dB and preferably greater than 3 dB.

20. A wavelength division multiplex fiber optic optical transmission system including a regenerator including:
   a demultiplexer supplying demultiplexed channels at its output,
   for each demultiplexed channel, a multiplexer coupling continuous light with the signals of said channel, an intensity modulator modulating said signals of said channel and said continuous light and a Kerr fiber phase modulating said transmitted signals with said intensity-modulated continuous light by crossed phase modulation, and
   a multiplexer receiving said phase-modulated signals of each channel and supplying a multiplexed signal.

21. The system claimed in claim 20 wherein said continuous light is supplied by a single source.

22. The system claimed in claim 21 including an amplifier for amplifying said signals from said source.

23. The system claimed in claim 20 wherein said intensity modulator is a Mach-Zender modulator.

24. The system claimed in claim 20 wherein said Kerr fiber has a non-linearity index greater than $2.7 \times 10^{-20}$ m$^2$/W.

25. The system claimed in claim 20 wherein the chromatic dispersion of said Kerr fiber for a channel cancels out at a wavelength which is the average of the wavelengths of said signals of said channel and said continuous light.

26. The system claimed in claim 20 wherein the depth of intensity modulation in an intensity modulator is greater than 1 dB and preferably greater than 3 dB.

27. An optical regeneration method including the following steps:
   coupling continuous light with transmitted signals;
   conjoint intensity modulation of said transmitted signals and said continuous light; and
   phase modulation of said transmitted signals by crossed phase modulation with said intensity-modulated continuous light.

28. The method claimed in claim 27 wherein said intensity modulation is effected with a modulation depth greater than 1 dB.

29. The method claimed in claim 28 wherein said phase modulation is effected with a modulation depth of 3 dB.

30. The method claimed in claim 27 including a step of filtering said intensity-modulated continuous light after said modulation step.

* * * * *